A. C. BERG.
LAWN TRIMMER.
APPLICATION FILED MAR. 21, 1918.
1,287,840.
Patented Dec. 17, 1918.
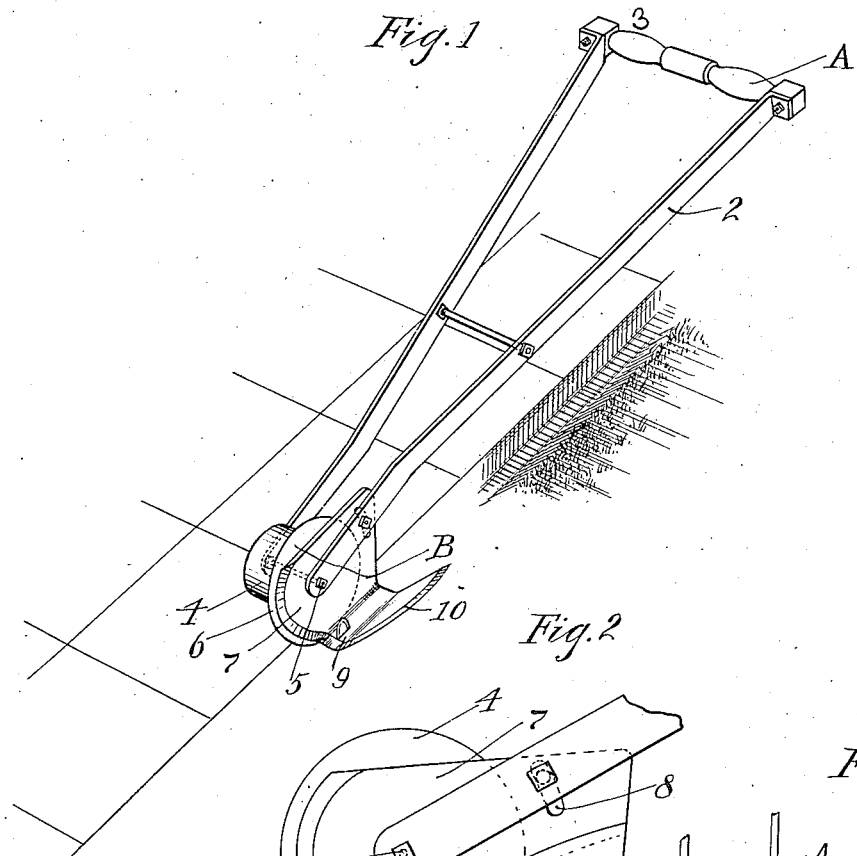
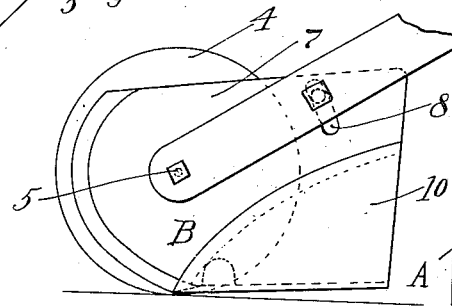
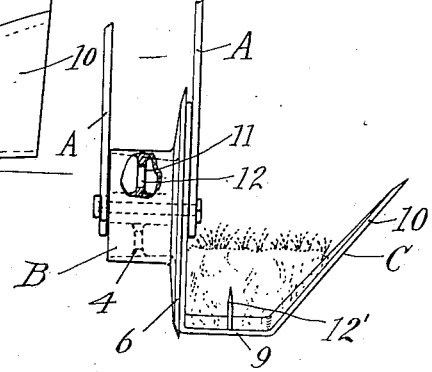
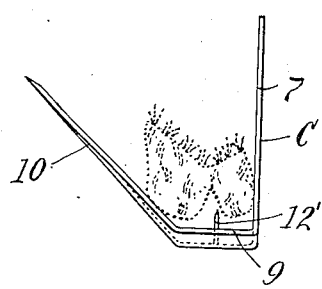
Inventor,
Anton C. Berg
his Attorney.

UNITED STATES PATENT OFFICE.

ANTON C. BERG, OF WHITE BEAR, MINNESOTA.

LAWN-TRIMMER.

1,287,840.  Specification of Letters Patent.  Patented Dec. 17, 1918.

Application filed March 21, 1918. Serial No. 223,836.

*To all whom it may concern:*

Be it known that I, ANTON C. BERG, a citizen of the United States, residing at White Bear, in the county of Ramsey and State of Minnesota, have invented certain new and useful Improvements in Lawn-Trimmers, of which the following is a specification.

This invention relates to improvements in lawn trimming tools and more especially to the type used for trenching the edges of lawns adjacent to paved walks and cinder paths.

The object of my invention is to provide an improved implement which may be operated with ease and be simple and cheap of construction.

The invention consists in the features of construction, combination and arrangement of parts hereinafter described having reference to the accompanying drawings, of which—

Figure 1 is a perspective view of a lawn trimmer implement embodying my invention in which it is shown as being used on a tile walk, Fig. 2 is a fragmentary view of the wheel and blade, Fig. 3 is a front view of Fig. 2 showing in dotted lines a quantity of sod in the blade, Fig. 4 is a rear view of the blade alone showing in dotted lines the ultimate position of the sod at the rear of the blade.

The device comprises a frame A, a cutter wheel B, and a cutting blade C. The frame comprises a pair of side rails 2 spread outwardly and joined at their outer ends by a handle 3 whereby the device may be propelled.

The lower ends of the rails are bent to render them parallel and are adapted to receive rotatably between them a cutter wheel 4, journaled on a bolt 5 which has threaded nut fastening in the ends of the rails.

The cutter wheel 4 is formed with a comparatively wide rolling face and a comparatively large thin flange 6 having a peripheral knife edge ground from the rolling face outwardly, and has a central web 11 pierced by holes 12.

Interposed between the flange 4 of the wheel and one of the rails 2 and pierced by the bolt 5 and pivoting thereon is the vertical wall 7 of the cutting blade C, a slot and bolt adjustment 8 being suitably positioned thereon to bring the handle A into a conveniently operable position. Thus the cutting blade is supported on the wheel 4.

The cutting blade is bent at right angles at the base of the wall 7, thereby forming a bottom 9 which in turn is bent upward and outwardly forming a comparatively long, narrow channel having a vertical and an outwardly flaring wall 10.

Viewed from the side (Fig. 2) the contour of the front edge of the wall 7 closely follows the circular outline of the cutting flange of the cutter wheel, the front horizontal edge of the bottom of the cutting blade coinciding with said circular outline. Thus, when the blade is rotated about the bolt 5, the front edge of the wall 7 will retain a parallel relation with the outline of the wheel. The contour of the outer flaring wall 10 is a comparatively flat curve receding from the front edge of the bottom 9 rearwardly.

The front edges of the cutting blade are ground to a knife edge from within outwardly to cut the turf as the implement (guided against the edge of the cement walk by the flange 4) is pushed forwardly, the sharp peripheral edge of the flange cutting one side of the turf slightly in advance of the blade.

It will be noted, upon inspection of the drawings, that the beveled front edge of the wall 7 lies with its outer side flatly against the flange 4, thereby diverting any dirt that might tend to wedge in between them, the beveled sharp edge cutting the stray blades of the grass tending to clog the apparatus at that point whereby entanglement is avoided. If some material should work its way between the flange and the wall 7, it will enter the central cavity of the wheel and be discharged through the openings 12 in the web 11.

As the turf is cut it passes between the walls of the blade in the form of a strip or ribbon and frequently (when very damp) will pack in the channel and stop operations. To overcome this disadvantage, I provide a slitting knife 12' secured in the forward part of the blade in the path of the severed rearwardly traveling turf, which partially splits the strip lengthwise from beneath upward, to cause it to be weakened so as to break and crumble (Fig. 4) before it can bind and pack in the channel of the blade.

While I have shown a flat bottom in the cutting blade, I wish it to be understood that the slitting knife will operate equally well in a concave bottom.

In operation the blade may be tilted to any suitable angle by shifting the bolt in the slot 8.

I claim:

In an implement of the class described, a handle comprising two outwardly flaring side bars bent at their forward ends into spaced parallelism, a laterally disposed bolt spanning said space and connecting said side bars, said bolt supporting rotatably a flanged wheel, said flanged wheel comprising a central hollow portion having a wide face adapted to roll on the side-walk, and a flanged portion having a peripheral knife edge; a cutter blade comprising a plate bent to form a vertical wall pierced by said bolt and supported thereon, a flat outwardly projecting bottom rearwardly inclined and an upwardly and outwardly projecting outer wall, said vertical wall being snugly held in vertical position between the flange of said wheel and one of said side bars, and closing loosely one end of the central hollow portion of said wheel, and a perforated web in the hollow of said wheel, the perforations therein serving to free said hollow of any soil working its way into said space.

In testimony whereof I affix my signature in presence of two witnesses.

ANTON C. BERG.

Witnesses:
GEORGE VOELKER,
FLORENCE WINKLER.